United States Patent
Wang et al.

(10) Patent No.: US 11,319,949 B2
(45) Date of Patent: May 3, 2022

(54) ANALYSIS METHOD OF ABSOLUTE ENERGY EFFICIENCY AND RELATIVE ENERGY EFFICIENCY OF COMPRESSED AIR SYSTEM

(71) Applicant: HANG ZHOU ZETA TECHNOLOGY CO., LTS, Hangzhou (CN)

(72) Inventors: Xiaohua Wang, Hangzhou (CN); Chaoyang Zhai, Hangzhou (CN); Kai Zhao, Hangzhou (CN); Qi Lu, Hangzhou (CN); Zhongcai Tang, Hangzhou (CN); Xiang Fan, Hangzhou (CN)

(73) Assignee: HANG ZHOU ZETA TECHNOLOGY CO., LTS, Hangzhou (CN)

( * ) Notice: Subject to any disclaimer, the term of this patent is extended or adjusted under 35 U.S.C. 154(b) by 0 days.

(21) Appl. No.: 17/389,280

(22) Filed: Jul. 29, 2021

(65) Prior Publication Data

US 2021/0355932 A1  Nov. 18, 2021

Related U.S. Application Data

(63) Continuation of application No. PCT/CN2019/122514, filed on Dec. 3, 2019.

(30) Foreign Application Priority Data

Feb. 12, 2019  (CN) .......................... 201910111932.6

(51) Int. Cl.
  *F04B 51/00* (2006.01)
  *F04B 23/00* (2006.01)
  *G01F 9/00* (2006.01)

(52) U.S. Cl.
  CPC .............. *F04B 51/00* (2013.01); *F04B 23/00* (2013.01); *G01F 9/00* (2013.01)

(58) Field of Classification Search
  CPC ............ F04B 23/00; F04B 51/00; G01F 9/00
  See application file for complete search history.

(56) References Cited

U.S. PATENT DOCUMENTS

| | | | |
|---|---|---|---|
| 6,505,475 B1 * | 1/2003 | Zugibe | F24F 11/30 62/192 |
| 7,464,061 B2 * | 12/2008 | Grothmann | G05B 13/027 706/15 |
| 9,261,542 B1 * | 2/2016 | West | F25B 49/00 |
| 9,765,979 B2 * | 9/2017 | Alsaleem | F24D 19/1087 |
| 9,823,632 B2 * | 11/2017 | Pham | F25B 49/005 |
| 2006/0042258 A1 | 3/2006 | Gadde et al. | |

FOREIGN PATENT DOCUMENTS

| | | |
|---|---|---|
| CN | 102102645 A | 6/2011 |
| CN | 102767529 A | 11/2012 |
| CN | 103452815 A | 12/2013 |
| CN | 104424372 A | 3/2015 |
| CN | 104635684 A | 5/2015 |
| CN | 106404062 A | 2/2017 |
| CN | 110362844 A | 10/2019 |

OTHER PUBLICATIONS

International Application No. PCT/CN2019/122514, International Search Report dated Mar. 4, 2020 (English translation), 2 pgs.
Chinese Application No. 201910111932.6, Supplemental Search Report (English translation), 1 pg.
Chinese Application No. 201910111932.6, First Search Report (English translation), 2 pgs.
Chinese Application No. 201910111932.6, First Office Action (with English translation), dated Jun. 3, 2020, 8 pgs.
Chinese Application No. 201910111932.6, Notification to Grant (with English translation), dated Dec. 4, 2020, 2 pgs.
Sun, X., et al., "", GB/T 16665-2017: Monitoring and testing for energy saving of air compressor unit and air distribution system, National Standards of the People's Republic of China (Oct. 14, 2017), 16 pgs.

* cited by examiner

*Primary Examiner* — Patrick Hamo
(74) *Attorney, Agent, or Firm* — Schwegman Lundberg & Woessner, P.A.

(57) ABSTRACT

An analysis method of absolute energy efficiency and relative energy efficiency of the compressed air system. For the compressed air system operating in a form of a single compressor, a gas flow rate and a corresponding operating power of the compressor operating in the single compressor model are measured under a specified flow rate. Meanwhile, influencing factors of the compressor operation are monitored. The absolute energy efficiency of the compressor is defined, and a curve of the absolute energy efficiency of the compressor varying with the operating time versus the above factors are plotted in a same coordinate system. Obtaining absolute energy efficiency data of the compressor in a corresponding state. By analyzing the absolute energy efficiency under corresponding conditions and based on the corresponding chart, the actual unit consumption of a given single compressor and its changing rule under different production and environmental operating conditions can be intuitively analyzed.

4 Claims, No Drawings

ANALYSIS METHOD OF ABSOLUTE ENERGY EFFICIENCY AND RELATIVE ENERGY EFFICIENCY OF COMPRESSED AIR SYSTEM

CROSS REFERENCE TO RELATED APPLICATIONS

This application is a continuation of PCT/CN2019122514 filed Dec. 3, 2019, which claims priority to CN 201910111932.6 filed Feb. 12, 2019, both of which are incorporated herein by reference.

TECHNICAL FIELD

The disclosure relates to an operation monitoring technology for a compressed air system, in particular to an analysis method of absolute energy efficiency and relative energy efficiency of the compressed air system.

BACKGROUND ART

In metallurgy, nonferrous metal, iron and steel, petrochemical industries, compressed air is an important energy source, and a system therefore is a typical nonlinear dynamical system; and its operation is directly affected by variable environmental operating conditions and production load intensity, and is complex and changeable as a whole. For such a complex system, parameters that can be monitored in traditional design, operation and maintenance are a series of process parameters coupling with each other, such as discharge pressure; flow rate, discharge temperature, compressed air temperature at inlets and/or outlets of each level, motor voltage, motor current, motor power, inlet guide vane opening degree, blow-off valve closing degree and the like of a compressor. A problem existing with these parameters is that they are all coupling parameters, so it is difficult to judge a system operation state, especially an energy, efficiency state, according to one of them. Considering changes of the compressed air with operating conditions, control parameters used mainly are system pressure and motor current during a practical operation process. Controls of these two parameters are based on anti-surge characteristics of the compressor in combination with the inlet guide vane opening degree and the BOV closing degree of the compressor.

As for a design of the compressed air system, due to complex thermodynamic characteristics of gas in compression engineering, traditional design methods mostly use three models based on various assumptions to analyze compressor efficiency: an adiabatic model, an isothermal model and a polytropic model. During the practical operation process, considering a Multi-stage cooling (water cooling and air cooling) mode, a best isothermal process is selected as a reference for an efficiency analysis (an adiabatic condition is difficult to meet and a polytropic process is too complicated). Under such an analysis condition, a pressure ratio of the compressed air system is directly affected by environmental operating conditions. However, there is few literatures to analyze and monitor an influence of the environmental operating conditions on a compressor operation state during the actual operation process. In addition, in the traditional analysis method, even if the environmental operating conditions are considered, the monitored pressure ratio is often a ratio of the discharge pressure to an atmospheric pressure at an intake port of the compressor. There is a problem in essence that a corresponding filter section (which is self-cleaning type or provided together with the intake port) is provided at the intake port of the compressor, and the atmospheric pressure is required to pass through the filter sections first under suction of a centrifuge inlet. After passing through this section, there must be a loss caused by local resistance, and an amount of this loss is directly affected by environmental cleanliness. Alternatively, for the compressor, an actual effective pressure ratio should not be obtained by the atmospheric pressure at the intake port, but a gas pressure after the inlet filter section. This is a direct problem existing in traditional monitoring; and the other side of this problem is that due to a lack of effective detection of the gas pressure at the inlet section, a monitoring of the filter resistance is often vague, resulting in a lack of a direct and objective basis for cleaning, operation and replacement of the filter.

Even under such problematic monitoring conditions, in fact, parameters about compressor energy consumption obtained by users are often only a current, a voltage, a power and a power factor and electricity consumption of the motor. Taking the centrifuge and a screw compressor as examples, for a centrifugal compressor, a characteristic curve of the centrifuge will change once each time an angle is adjusted for the inlet guide vane opening degree. This is a problem caused by the complex characteristics of the equipment itself, but monitoring data for the influence of the guide vane opening degree on the operating characteristics of the compressed air system is extremely lacked. Even if a change of the inlet guide vane opening degree with operating conditions is monitored, it is difficult to determine its influence on the compressor operating energy efficiency due to the coupling characteristics of these various monitored parameters. As for the screw compressor, although it is volumetric and its discharge volumetric flow rate is basically independent of the environmental operating conditions. However, for the compressed air system, maintenance of the pressure is actually controlled by the mass flow rate, that is to say, actual gas flow rate and corresponding operating energy efficiency state of the screw compressor at a same place change with spring, summer, autumn or winter. In addition, the screw compressor mostly realizes a control of a change of an operating pressure of a matching system through loading and unloading and frequency conversion, which increases complexity of its operating energy efficiency analysis from another aspect. Both the speed compressor and the displacement compressor have the same problems, but for the compressed air system with a complex chain flow, it is often composed of multiple air compressors in parallel and the whole air compressed station lacks a monitoring and analysis mechanism for the operating energy efficiency to a greater extent.

In terms of operating efficiency, China National Standards GB19153 and GB50029 present certain regulations: GB19153 specifies energy efficiency grades of the displacement compressor such as piston compressor and screw compressor within a certain capacity range, which adopt a definition of specific power, and are divided according to a ratio of motor power to air displacement. The specific power is a direct representation of an absolute value of the energy consumption per unit gas flow rate of the compressor under corresponding operating conditions, it lacks consideration of an operating condition change, and is very important but not enough to describe the change of the system operating energy efficiency with the operating conditions. GB50029 establishes a concept of comprehensive transmission efficiency of the air compressed station, and its formula is as follows:

$$\eta = \delta \times \eta_W$$

$$\delta = 1 + 0.2 \times \eta_R$$

$$\eta_R = \frac{E_R}{\Sigma E_K} 100\%$$

$$\eta_W = \frac{16.67 \times P_X \times Q_Z \times t \times \ln((P_Z + P_X)/P_X)}{E_Z}$$

η—comprehensive transmission efficiency of the compressed air station, in %;

δ—correction coefficient of compression heat recovery:

$\eta_w$—transmission efficiency of the compressed air station, in %;

$\eta_R$—recovery rate of compression heat energy, in %;

$E_R$—heat energy recovered by the compressed air station, in kilowatt hour (kW·h);

$E_K$—total power consumption of air compressor unit, in kilowatt hour (kW·h);

$P_x$—suction pressure of air compressor, which is an absolute pressure, in MegaPascal (MPa);

$Q_z$—total air supply of compressed air station (suction state of air compressor) during a measurement period, in cubic meter per minute m³/min);

t—measurement cycle, in hour (h);

Pz—supply air pressure of compressed air station, which is a gauge pressure, in MegaPascal (MPa); and $E_z$—total electricity consumption of compressed air station during the measurement period, in kilowatt hour (kW·h).

Relatively speaking, this takes into account the influence of the change of the operating conditions on the operating efficiency of the whole air compressed station, and establishes a mechanism for analyzing the operating efficiency of the whole air compressed station with an isothermal shaft power as reference. Problems existing with this mechanism are as follows: 1) it is a whole station analysis, which lacks a basis for a single compressor analysis; 2) the compressed air station is composed of different compressors, and the different compressors operate with different ratios; which leads to different operating characteristics of the compressed air station, but this change process cannot be characterized in the system; 3) in an expression of transmission efficiency of the compressed air station $\eta_w$, its numerator involves values of the inlet pressure and manifold pressure, which change in real-time (concepts "instantaneous" and "total energy consumption" are contradictory, the concept "instantaneous" means the power, and the concept "total energy consumption" means electricity amount, and the power is variable), and its denominator is power consumption in a certain period of time, so these two concepts are contradictory; 4) the expression of the transmission efficiency of the compressed air station is equivalent to a shaft power of an isothermal process; however, under its corresponding operating conditions, the motor characteristics (that is, conversion efficiency of the motor under different load intensities) should be considered for the power of the motor, but this formula lacks consideration of this influence; 5) an introduction of the waste heat recovery efficiency is actually in contradiction with GB19153. The problem of waste heat recovery should be analyzed separately. Considering GB19153, introduction of the waste heat recovery definitely means beyond the Energy Efficiency Grade 1, but this is parallel to the operation efficiency of the compressor itself. For the energy efficiency of the compressed air system, the characteristics of the compressor itself should be firstly considered; and then, the operation characteristics of the whole air compressed station are analyzed based on the energy efficiency characteristics of a single compressor. Of course, for a modern compressed air system, waste heat recovery is an important feature of energy-saving, so it should be analyzed in detail separately and considered comprehensively.

SUMMARY

A technical problem to be solved by the disclosure is to overcome defects in the prior art and to provide an analysis method of absolute energy efficiency and relative energy efficiency of a compressed air system.

To solve the technical problem, a solution of the disclosure is as follows:

An analysis method of absolute energy efficiency of a compressed air system operating in a single compressor mode is provided, which includes following steps:

(1) A gas flow rate and a corresponding operating power of the compressor operating in the single compressor model are measured under a specified gas flow rate; meanwhile, influencing factors of the compressor operation are monitored, the influencing factors including intake port temperature, humidity; atmospheric pressure, effective pressure after a filter, discharge pressure and effective pressure ratio.

(2) The absolute energy efficiency of the compressor is defined as follows:

$$\eta_{Ai} = \frac{N_i}{Q_i}$$

Here, $\eta_{Ai}$ is a value of real-time absolute operating energy efficiency of a single compressor numbered i; $N_i$ is an operating power of the single compressor, in kw; and $Q_i$ is the gas flow rate of the single compressor, in m³/min.

Numerical change curves of the absolute energy efficiency of the compressor varying with the operating time and of the above influencing factors are plotted in the same coordinate system.

The compressor power used in this formula is the operating power under actual operating conditions, but not a shaft power of the compressor, which can be used to directly analyze electric energy consumed by the compressor in producing unit compressed air. Combined with the detected environmental parameters (temperature, pressure, and humidity), determine the chances and rules of a unit consumption of corresponding equipment under different environmental operating conditions can be determined. Especially for a centrifuge, under a same inlet guide vane (IGV) and blow off valve (BOV) closing, an influence of different environmental operating conditions on the unit consumption can be illustrated in a form of a chart, in which the ordinate can be selected as the absolute enemy efficiency, and the abscissa can be taken as the inlet air temperature, pressure, and humidity respectively. Meanwhile, different values of the above two opening/closing degree can be combined in the diagram to analyze the influence.

In a data monitoring and analysis, a numerical change curves of the absolute energy efficiency of the compressor varying with the operating time and of the above influencing factors are plotted in a same coordinate system. This parameter does not need to be corrected, it is the ratio of electricity consumption to gas flow rate during the actual operation process, and the only thing that needs to be adjusted is a gas state (standard state) defined or determined by the user during benchmarking;

(3) According to the standard gas state defined by the user, combined with monitoring results of various influencing factors (i.e., gas parameters displayed by the instrument such as intake port temperature, humidity, atmospheric pressure, effective pressure after the filter, discharge pressure and effective pressure ratio described above), the influence on the absolute energy efficiency of the compressor can be corrected to obtain absolute energy efficiency data of the compressor in a corresponding state.

Instead of the traditional specific power analysis concept, it is further required in the present disclosure to monitor the intake port temperature, the humidity, the atmospheric pressure, the effective pressure after the filter, the discharge pressure and the effective pressure ratio, which are represented with different color curves together with absolute energy efficiency at a same interface, in which the corresponding ordinate can be used to analyze the influence of various factors on the absolute operating energy efficiency and lay a foundation for a single factor analysis, Which is not the same as any type of monitoring and analysis in the traditional mechanisms.

For example, the influence of the inlet temperature, the humidity and the pressure on the absolute energy efficiency analysis can be made on a basis of a large number of monitored data with the absolute energy efficiency as the ordinate and environmental parameters at different sampling times as the abscissa, to construct a data curve. In this way, the influence of various factors on the absolute energy efficiency at the corresponding time and under given machine conditions can be directly determined. The influence of these factors on the compressor operating characteristics can be objectively shown, and the influence of the environmental operating conditions and the production load intensity on the absolute energy efficiency under the same inlet guide vane (IGV) and blow off valve (BOV) opening and/or closing degree can be revealed.

The disclosure also provides an analysis method of absolute energy efficiency of a compressed air system operating in the form of an air compressed station, which includes following steps:

(1) obtaining corrected absolute energy efficiency data of every single compressor in the air compressed station according to the above method;

(2) averaging the absolute operating energy efficiencies of respective single compressors numbered i in a specified period:

$$\overline{\eta_{Ai}} = \frac{\sum_i \eta_{Ai}}{M_i}$$

Here, $\overline{\eta_{Ai}}$ is an average value of all sampled specific powers of the compressors numbered i in the specified period; $\eta_{Ai}$ is the value of the real-time absolute operating energy efficiency of the compressor numbered i; and $M_i$ is a total sampling number for the compressor numbered i in this period; and (3) constructing an absolute energy efficiency model of the air compressed station in the specified period, with a proportion of operating time of each equipment in the specified period as a weight:

$$\eta_{AS} = \sum_i \frac{t_i}{t} \overline{\eta_{Ai}}$$

Here:

$\eta_{AS}$ is the absolute energy efficiency of the air compressed station in the specified period; t is a value of the specified period, in h; $t_i$ is the operating time of the compressor numbered i in the specified period, in h.

The disclosure also provides an analysis method of relative energy efficiency of a compressed air system operating in the form of a single compressor, which includes following steps:

(1) obtaining corrected absolute energy efficiency data of the single compressor in the air compressed station according to the above method; and (2) calculating the relative energy efficiency of the single compressor based on absolute operating energy efficiency according to characteristics of a given compressor:

$$\eta_{R1i} = \frac{\eta_{DAi}}{\eta_{Ai}} 100\%$$

Here:

$\eta_{R1i}$ is the relative operating energy efficiency of the single compressor numbered i obtained according to the given compressor characteristics; $\eta_{Ai}$ is the absolute operating energy efficiency of the single compressor numbered i under current operating conditions; and $\eta_{DAi}$ is a correspondingly designed absolute operating energy efficiency of the single compressor numbered i under the current operating conditions.

On this basis; the disclosure also provides an analysis method of relative energy efficiency of a compressed air system operating in the form of an air compressed station, which includes following steps:

(1) obtaining relative energy efficiency data of each single compressor in the air compressed station according to the above method;

(2) averaging the relative operating energy efficiency of each single compressor numbered i in a specified period:

$$\overline{\eta_{R1i}} = \frac{\sum_i \eta_{R1i}}{M_i}$$

Here, $\overline{\eta_{R1i}}$ is an average value of the relative operating energy efficiency of the single compressor numbered i the specified period obtained according to given compressor characteristics; $\eta_{R1i}$ is the relative operating energy efficiency of the single compressor numbered i obtained according to the given compressor characteristics; and $M_i$ is a total sampling number for the compressor numbered i in this period; and (3) constructing a relative energy efficiency model of the air compressed station in the specified period, with a proportion of operating time of each equipment in the specified period as a weight:

$$\eta_{RS1} = \sum_i \frac{t_i}{t} \overline{\eta_{R1i}}$$

Here:

$\eta_{RS1}$ is the relative energy efficiency of the air compressed station in the specified period; t is a value of the specified period, in h; $t_i$ and is the operating time of the compressor numbered i in the specified period, in h.

The disclosure further provides an analysis method of relative energy efficiency of a compressed air system operating in the form of a single compressor, which includes the foil owing:

calculating the relative energy efficiency of the single compressor according to the isothermal cooling power of the compressor:

$$\eta_{R2i} = \frac{16.67 \times P_{Xi} \times Q_i \times \ln((P_{Oi} \times P_{Xi})/P_{Xi})/\eta_{Mi}}{N_i} 100\%$$

Here, $\eta_{R2i}$ is the relative operating energy efficiency of the single compressor numbered i; $P_{Xi}$ is an effective suction pressure after a filter at an inlet of the compressor, in MPa; $Q_i$ is a displacement of the compressor under a specified state, in m³/min; $P_{Oi}$ is a measured discharge pressure of the compressor, in MPa; $\eta_{Mi}$ is a conversion efficiency of the motor of the compressor under a load rate corresponding to the isothermal cooling shaft power; and $N_i$ is a measured operating power of the compressor under current conditions, in kW.

Different from the definition from GB50029, the second type of relative operating energy efficiency model for the single compressor is a value varying with time, and the pressure, the flow and the power are all instantaneous values, and in this way, there is no contradiction between instantaneous and average concepts, and additionally the motor characteristics are combined, which is more reasonable. The first kind of relative operating energy efficiency is to analyze a relative change of the absolute operating energy efficiency under given designed characteristics; and rather the second kind of relative operating energy efficiency is to analyze all operating conditions under benchmarking of the isothermal cooling, and design differences of different machines are implied in a value of actual operating power. Advantages of this model is that the effective suction pressure and pressure ratio are included (the effective suction pressure refers to the effective inlet pressure after the filter), which can further visually analyze the energy efficiency under different pressure, pressure ratio and production load intensity.

On this basis, the disclosure further provides an analysis method of relative energy efficiency of a compressed air system operating in the form of an air compressed station, which includes following steps:

(1) obtaining relative energy efficiency data of every single compressor in the air compressed station according to the above method;

(2) averaging the relative operating energy efficiency of each single compressor numbered i in a specified period:

$$\overline{\eta_{R2i}} = \frac{\sum_i \eta_{R2i}}{M_i}$$

Here, $\overline{\eta_{R2i}}$ is an average value of the relative operating energy efficiency of the single compressor numbered i in the specified time period; $\eta_{R2i}$ is the relative operating energy efficiency of the single compressor numbered i; $M_i$ is a total sampling number for the compressor numbered i in this period; and (3) constructing a relative energy efficiency model of the air compressed station in the specified period, with a proportion of operating time of each equipment in the specified period as a weight:

$$\eta_{RS2} = \sum_i \frac{t_i}{t} \overline{\eta_{R2i}}$$

Here:

$\eta_{RS2}$ is the relative energy efficiency of the air compressed station in the specified period; t is a value of the specified period, in h; and $t_i$ is the operating time of the compressor numbered i in the specified period, in h.

Compared with the prior art, the disclosure has the following beneficial effects:

1) According to the disclosure, by analyzing the absolute energy efficiency under corresponding conditions and based on the corresponding chart, the actual unit consumption of a given single compressor and its changing rule under different production and environmental operating conditions can be intuitively analyzed, especially the visual analysis of the continuous changing rule of the absolute energy efficiency under different inlet parameters can be made, which is a gap in existing energy efficiency analysis mechanisms.

2) The absolute energy efficiency in this disclosure reflects the actual value of the unit consumption of the compressor in a given condition (including the environment, production and equipment conditions itself), which can't further show the difference from the compressor design characteristics under the corresponding operating conditions, or stated differently, it can't be judged whether the machine itself is in a good condition. Therefore, a concept of the relative energy efficiency analysis is introduced for the first time in this disclosure, in which the operating absolute energy efficiency is compared with its corresponding designed absolute energy efficiency to intuitively reflect a relative condition of the equipment, which is an innovative concept.

3) In view of deficiencies in the energy efficiency analysis in new and old national standards, the disclosure directly improves and establishes a new energy efficiency analysis formula;

4) Through innovatively introducing the concept of the proportional weight based on the equipment operating number and the operating time, the overall operating energy efficiency of the air compressed station is given, which cannot be reflected in the traditional concept and belongs to the innovative content of the present disclosure.

5) Furthermore, another innovation of the disclosure lies in a high-precision visual analysis of the overall energy efficiency of the single compressor and/or an air compressed station under different environmental operating conditions and production load conditions.

DETAILED DESCRIPTION

Aiming at a complex compressed air system, an operating energy efficiency analysis mechanism for a single compressor and/or an air compressed station is established, and a corresponding mathematical model of the energy efficiency analysis is established. Firstly, rather than a traditional energy efficiency analysis mechanism, a concept of absolute energy efficiency analysis and relative energy efficiency analysis is proposed.

1. Absolute Operating Energy Efficiency Analysis

The absolute energy efficiency analysis mechanism is divided into two parts, one is the absolute operating energy efficiency analysis of a single compressor; and the other is, on a basis of the single compressor analysis, to take characteristics of the single compressor operating time into account to make the absolute operating energy efficiency analysis for the whole air compressed station. A basic idea and model are as follows:

1) Absolute operating energy efficiency analysis for a single compressor

For the compressor in operation, no matter what type of the compressor is, a gas flow rate $Q_i(m^3/min)$ (under a value of a specified gas flow rate) is measured under current operating conditions and a corresponding operating power $N_i$ (kW) were measured at the same time, and the absolute energy efficiency of the compressor was defined as:

$$\eta_{Ai} = \frac{N_i}{Q_i}$$

Its value represents a value of real-time specific power under its operating conditions and the data table of GB19153 can be used to judge its operating energy efficiency grade, which can be modeled to establish a different database to judge the operating specific power under a corresponding pressure, compare it with different energy efficiency grade standards, and show direct results. This parameter lacks consideration of real-time and historical trend monitoring and analysis in actual operations.

Instead of the traditional specific power analysis concept, it is further required in the present disclosure to monitor the intake port temperature, the humidity, the atmospheric pressure, the effective pressure after the filter, the discharge pressure and the effective pressure ratio so that a curve of the absolute energy efficiency of the compressor varying with the operating time versus the above factors are plotted in a same coordinate system, which are represented with different color curves together with absolute energy efficiency at a same interface, in which the corresponding ordinate can be used to analyze the influence of various factors on the absolute operating energy efficiency and lay a foundation for a single factor analysis, which is not the same as any type of monitoring and analysis in the traditional mechanisms.

For example, the influence of the inlet temperature, the humidity and the pressure on the absolute energy efficiency analysis can be made on a basis of a large number of monitored data with the absolute energy efficiency as the ordinate and environmental parameters at different sampling times as the abscissa, to construct a data curve, in this way, the influence of various factors on the absolute energy efficiency at the corresponding time and under given machine conditions can be directly determined. The influence of these factors on the compressor operating characteristics can be objectively shown, and the influence of the environmental operating conditions and the production load intensity on the absolute energy efficiency under a same inlet guide vane (IGV) and blow off valve (BOV) opening and/or closing degree can be revealed.

2) Overall absolute energy efficiency analysis for the air compressed station in a certain period With different compressor types and manufacturers for the air compressed station, a time analysis is added to each compressor in operation. For different machines operating in a specified period, the absolute operating energy efficiencies of respective single compressors are averaged firstly in a numbered order:

$$\overline{\eta_{Ai}} = \frac{\sum_i \eta_{Ai}}{M_i}$$

Here:

$\overline{\eta_{Ai}}$—an average value of all sampled specific powers of the compressors numbered i in the specified period;

$\eta_{Ai}$—a real-time absolute operating energy efficiency of the compressor numbered i;

$M_i$—total number of samples of the compressor numbered i in this period.

The above formula gives the average value of the absolute operating energy efficiency of the compressor numbered i in the specified period.

An absolute energy efficiency model of the air compressed station in the specified period, with a proportion of operating time of each equipment in the specified period as a weight, can be constructed:

$$\eta_{AS} = \sum_i \frac{t_i}{t} \overline{\eta_{Ai}}$$

Here:

$\eta_{AS}$—the absolute energy efficiency of the air compressed station in the specified period;

t—a value of the specified period (h);

$t_i$—the operating time of the compressor numbered i in the specified period (h);

The model considers the overall absolute operating energy efficiency of the same air compressed station with different operating compressors. And an advantage of this model is to clarify changes of the absolute operating energy efficiency in different operating compressor combinations in different periods.

2. Relative Operating Energy Efficiency Analysis

As mentioned above, the energy efficiency analysis of the whole air compressed station should consider two modes: a single compressor model and a station model. Although the absolute energy efficiency is intuitive, its problem is also obvious, that is, the operating conditions of the compressors vary, and the absolute operating energy efficiency inevitably changes under different operating conditions, the absolute energy efficiency cannot be directly linked with the changes of operating conditions. Under different operating conditions, the isothermal cooling effect is the optimal power consumption of a compressed air system, which is only linked with the compression process and the waste heat utilization is not considered. On this premise, the relative operation energy efficiency analysis models for the single compressor and the overall air compressed station are constructed as follows:

1) Relative operating energy efficiency analysis for the single compressor

The relative operating energy efficiency model is still first developed for the single compressor, and the model has two meanings, one is based on the absolute operating energy efficiency model and according to the characteristics of a given compressor; and the other is to take isothermal cooling power as a reference, the two efficiency models are as follows $$\eta_{R1i} = \frac{\eta_{DAi}}{\eta_{Ai}} 100\%$$

Here:

$\eta_{R1i}$—the first type of relative operating energy efficiency of the compressor numbered i;

$\eta_{Ai}$—the value of a real-time absolute operating energy efficiency of a single compressor numbered i;

$\eta_{DAi}$—the correspondingly designed absolute operating energy efficiency of the compressor numbered i under current operating conditions.

The meaning of the first type of relative operating energy efficiency is a degree to which the operating specific power under the current operating condition (including an opening degree of an inlet guide vane and/or a BOV) deviates from that under the high-efficiency operating condition. For all compressors, the designed specific power is the optimal value, and with the compressor operating, its characteristics will inevitably decline, which should be based on the design parameters of the compressor itself. The first type of relative operation energy efficiency analysis can be used as a data benchmark for health diagnosis and operation maintenance. If it can be determined that the first type of relative operating energy efficiency is lower than 80% (a specific threshold can be determined according to the actual situation), the operation maintenance is required to be made to the compressor.

Corresponding to the first type of relative operating energy efficiency model for the single compressor, for each operating condition (inlet and outlet pressure, pressure ratio, temperature, humidity, flow rate, IGV/BOV), under the corresponding pressure, pressure ratio and flow rate, and with the isothermal cooling effect as a benchmark, the second type of relative operating energy efficiency model for the single compressor is established as follows:

$$\eta_{R2i} = \frac{16.67 \times P_{Xi} \times Q_i \times \ln((P_{Oi} + P_{Xi}))/\eta_{Mi}}{N_i} 100\%$$

Here:

$\eta_{R2i}$—the second type of relative operating energy efficiency of the compressor numbered i;

$P_{Xi}$—an effective suction pressure after a filter at an inlet of the compressor of the compressor numbered i, in MPa;

$Q_i$—a displacement of the compressor numbered i under a specified state, in m³/min;

$P_{Oi}$—a measured discharge pressure of the compressor numbered i, in MPa;

$\eta_{Mi}$ a conversion efficiency of the motor of the compressor numbered i under a load rate corresponding to the isothermal cooling shaft power;

$N_i$—a measured operating power of the compressor numbered i under current conditions, in kW.

As shown in the formula, different from the definition from GB50029, the second type of relative operating energy efficiency model for the single compressor is a value varying with time, and the pressure, the flow and the power are all instantaneous values, and in this way, there is no contradiction between instantaneous and average concepts, and additionally the motor characteristics are combined, which is more reasonable. The first kind of relative operating energy efficiency is to analyze a relative change of the absolute operating energy efficiency under given designed characteristics; and rather the second kind of relative operating energy efficiency is to analyze all operating conditions under benchmarking of the isothermal cooling, and design differences of different machines are implied in a value of actual operating power. The benefit of this model is that the effective suction pressure and pressure ratio are included (the effective suction pressure refers to the effective inlet pressure after the filter).

2) Overall relative operating energy efficiency model for the air compressed station in a specified period Based on the two types of operating energy efficiency models for the single compressor, considering the proportion of the operating time of a respective single compressor in a specified period, and based on the statistical average of the instantaneous value of the relative operating energy efficiency, the relative operating energy efficiency models for the whole air compressed station are constructed as follows:

First type of relative operating energy efficiency model for the air compressed station $$\eta_{RS1} = \sum_i \frac{t_i}{t} \overline{\eta_{R1i}}$$

Second type of relative operating energy efficiency model for the air compressed station $$\eta_{RS2} = \sum_i \frac{t_i}{t} \overline{\eta_{R2i}}$$

The above two formulas introduce the weight of each single compressor based on the proportion of its operating time, and the average of the first and second types of relative operating energy efficiency of different machines in the corresponding period.

$$\overline{\eta_{R1i}} = \frac{\sum_i \eta_{R1i}}{M_i}$$

$$\overline{\eta_{R2i}} = \frac{\sum_i \eta_{R2i}}{M_i}$$

Through the above-mentioned energy efficiency model, the overall operation energy efficiency of each compressor in operation and even of the whole air compressed station can be analyzed in real-time and historically, which can directly lay a foundation for operation, maintenance, optimization and health diagnosis.

What is claimed is:

1. An analysis method of an absolute energy efficiency of a compressed air system operating in a single compressor mode, comprising following steps:
    (1) measuring a gas flow rate $Q_i$ and a corresponding operating power $N_i$ of a compressor operating in the single compressor mode under a value state of a specified gas flow rate; and at the same time, monitoring influencing factors of the compressor on operation, the influencing factors comprising: an intake port temperature, a humidity, an atmospheric pressure, an effective pressure after a filter, a discharge pressure, and an effective pressure ratio;

(2) defining the absolute energy efficiency of the compressor as follows:

$$\eta_{Ai} = \frac{N_i}{Q_i}$$

in which $\eta_{Ai}$ is a value of a real-time absolute operating energy efficiency of a single compressor numbered i; $N_i$ is the operating power of the single compressor, in kW; and $Q_i$ is the gas flow rate of the single compressor, in $m^3$/min; and plotting a curve of the absolute energy efficiency of the compressor varying with an operating time versus the above influencing factors in a same coordinate system;

(3) according to a standard gas state defined by a user, combined with monitoring results of the influencing factors, correcting an influence on the absolute energy efficiency of the compressor to obtain an absolute energy efficiency data of the compressor in a corresponding state;

(4) optimizing operation of the compressor based on the absolute energy efficiency data of the compressor.

2. An analysis method of an absolute energy efficiency of a compressed air system operating in an air compressed station mode, comprising following steps:

(1) obtaining a corrected absolute energy efficiency data of each single compressor in the compressed air station according to the method of claim 1;

(2) averaging the absolute operating energy efficiency of each single compressor numbered i in a specified period:

$$\overline{\eta_{Ai}} = \frac{\sum_i \eta_{Ai}}{M_i}$$

in which $\eta_{Ai}$ is an average value of all sampled specific powers of the compressors numbered i in the specified period; $\eta_{Ai}$ is the value of the real-time absolute operating energy efficiency of the compressor numbered i; and $M_i$ is a total sampling number for the compressor numbered i in the specified period; and (3) constructing an absolute energy efficiency model of the air compressed station in the specified period, with a proportion of an operating time of different compressors in the specified period as a weight:

$$\eta_{AS} = \sum_i \frac{t_i}{t} \overline{\eta_{Ai}}$$

in which:

$\eta_{As}$ is the absolute energy efficiency of the air compressed station in the specified period; t is a value of the specified period, in h; $t_i$ is the operating time of the compressor numbered i in the specified period, in h.

3. An analysis method of a relative energy efficiency of the compressed air system operating in a single compressor mode, comprising following steps:

(1) obtaining a corrected absolute energy efficiency data of the single compressor in the air compressed station according to the method of claim 1; and (2) calculating a relative energy efficiency of the single compressor based on the absolute operating energy efficiency according to characteristics of a given compressor:

$$\eta_{R1i} = \frac{\eta_{DAi}}{\eta_{Ai}} 100\%$$

in which:

$\eta_{R1i}$ is the relative operating energy efficiency data of a single compressor numbered i obtained according to the characteristics of the given compressor; $\eta_{Ai}$ is the value of a real-time absolute operating energy efficiency of the single compressor numbered i; and $\eta_{DAi}$ is a correspondingly designed absolute operating energy efficiency of the single compressor numbered i under current operating conditions.

4. An analysis method of a relative energy efficiency of a compressed air system operating in an air compressed station mode, comprising following steps:

(1) obtaining the relative energy efficiency data of each single compressor in the air compressed station according to the method of claim 3;

(2) averaging the relative operating energy efficiency of each single compressor numbered i in a specified period:

$$\overline{\eta_{R1i}} = \frac{\sum_i \eta_{R1i}}{M_i}$$

in which, $\overline{\eta_{R1i}}$ is an average value of the relative operating energy efficiency of the single compressor numbered i in the specified period obtained according to given compressor characteristics; $\eta_{R1i}$ is the relative operating energy efficiency of the single compressor numbered i obtained according to the given compressor characteristics; and $M_i$ is a total sampling number for the compressor numbered i in the period; and (3) constructing a relative energy efficiency model of the air compressed station in the specified period, with a proportion of an operating time of different compressors in the specified period as a weight:

$$\eta_{RS1} = \sum_i \frac{t_i}{t} \overline{\eta_{R1i}}$$

in which:

$\eta_{RS1}$ is the relative energy efficiency of the air compressed station in the specified period; t is a value of the specified period, in h; and $t_i$ is the operating time of the compressor numbered i in the specified period, in h.

* * * * *